2,846,449
PRODUCTION OF TETRAHYDROFURAN

William H. Banford, Lewiston, N. Y., and Myron M. Manes, Plainfield, N. J., assignors to E. I. du Pont de Nemours and Company, Wilmington, Del., a corporation of Delaware No Drawing. Application August 15, 1956
Serial No. 604,086

5 Claims. (Cl. 260—346.1)

This invention relates to an improved process for the production of tetrahydrofuran. More particularly, it relates to a process for the production of tetrahydrofuran from furan obtained by the catalytic decomposition of furfural.

There is disclosed in the Whitman U. S. Patent 2,374,149 (1945) a method for converting furfural to furan by vapor-phase decarbonylation in the presence of steam over a catalyst composed of mixed chromites. The over-all equation for this decarbonylation reaction may be written as:

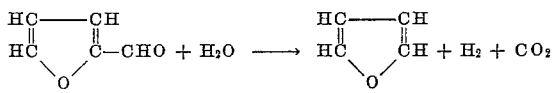

Tetrahydrofuran is obtained by hydrogenating furan, obtained in the above reaction, over a metal hydrogenation catalyst.

Hydrogenation of distilled furan from the decarbonylation process gives conversions to tetrahydrofuran of about 90% of the theoretical and uses hydrogenation catalyst corresponding to a consumption of about 0.5 lbs. active nickel per 100 lbs. tetrahydrofuran.

It is the object of this invention to provide an improved process for obtaining a more efficient conversion of catalytically decarbonylated furfural to tetrahydrofuran.

It is a further object to obtain the desired improvement by a simple and relatively inexpensive modification of the conversion process. Further objects will be apparent from the detailed description of the modified process.

It has now been discovered that the above objects may be attained by a process involving the treatment of the distilled furan from the decarbonylation of furfural with a caustic alkali selected from the group consisting of potassium and sodium hydroxides followed by hydrogenation over a metal hydrogenation catalyst. Our preferred process involves extraction of the furan with a dilute aqueous solution (1 to 15% by weight) of the said alkalis. This treatment results in raising the tetrahydrofuran conversion from 85–90% to approximately 98% of the theoretical and trebling the life of the hydrogenation catalyst. This invention applies principally to the furan obtained by the catalytic decarbonylation of the previously mentioned Whitman patent, U. S. Patent 2,374,149. The term "catalytic decarbonylation of furfural" as employed in this specification refers to material obtained by the process of this reference.

The hydrogenation step of our improved tetrahydrofuran process may be carried out by reaction with hydrogen at ordinary or elevated temperature over the usual metal hydrogenation catalysts. Such catalysts include finely divided nickel, platinum or palladium in the pure state or on an inert support. Preferred catalysts include foraminous or Raney nickel and finely divided reduced nickel or kieselguhr. Liquid phase continuous hydrogenation using tetrahydrofuran as a reaction medium is generally employed. A continuous hydrogenation involving recycling some of the tetrahydrofuran produced as a reaction medium is a preferred technique.

Furan obtained by the Whitman process contains small quantities of carbon dioxide and moisture that are not readily removed by distillation. The concentrations of these impurities range from about 0.1 to 0.5%. The presence of these materials complicates the treating process but does not affect the life of the hydrogenation catalyst.

Carbon dioxide also interferes with the hydrogenation procedure itself since it contaminates the recycle hydrogen in the continuous hydrogenation procedure. In this connection, carbon dioxide does not act as a catalyst poison or deactivator but as a neutral diluent which reduces the effective partial pressure of hydrogen. This reduction lowers the conversion rate in proportion to its effect on the hydrogen pressure. In the continuous hydrogenation, the carbon dioxide concentration in the recycle hydrogen increases continuously until it becomes necessary to purify this gas or discard it. However, yield reduction due to carbon dioxide is minor and expected. Caustic treatment gives an outstanding improvement in tetrahydrofuran yields over and above the reduction due to carbon dioxide contamination.

Both carbon dioxide and moisture tend to cause trouble in the caustic treating process unless dilute aqueous solutions are employed. This is due to the formation of concentrated solutions of alkali and alkali carbonate crystals which result in plugging conduits during continuous treatment with solid caustic as for example, in the form of caustic pellets. This also makes it impractical to use less soluble inorganic bases which swell on reaction with water and whose carbonates are relatively insoluble in water. Treatment with milder bases and cation-exchange resins leads to improvement in the hydrogenation process but does not remove carbon dioxide.

Addition of recycle tetrahydrofuran to furan in the continuous tetrahydrofuran process also contributes to contamination and plugging of equipment with solid carbonates since it dissolves water containing alkali carbonates with the resultant precipitation of solid carbonates. Experimentation has demonstrated that optimum results are obtained with approximately 3% aqueous sodium hydroxide or 10% potassium hydroxide. Accordingly, the preferred concentration ranges for the aqueous alkali hydroxide solutions are 2 to 4% in the case of sodium hydroxide and 8 to 12% for potassium hydroxide. Treatment of decarbonylated furfural with these solutions removes carbon dioxide and, in addition, gives a marked improvement in the conversion and catalyst life in the furan hydrogenation process without contaminating or plugging equipment with appreciable quantities of alkali carbonates. Any system of contacting the furan with these caustic solutions is satisfactory. Continuous liquid-liquid extractors are well known in the art and equipment of this type is readily adapted for use in our tetrahydrofuran process.

The following example is illustrative:

Example 1

A continuous liquid-liquid column extractor packed with porcelain saddles was charged with 10% aqueous potassium hydroxide. Distilled furan from the decarbonylation process was passed up through the caustic to a settling tank where suspended aqueous caustic could be removed. The treated furan from this extraction process was then heated and fed to a liquid phase hydrogenator containing an active nickel catalyst on a kieselguhr support at a temperature in the 85°–100° C. range. This hydrogenator was first fed with untreated furan. The conversion to tetrahydrofuran was approximately 85 to 90% of theory. The hydrogenator was then fed with alkali-treated furan. As a result the conversion to tetrahydrofuran gradually rose to 97% and remained at this value. After this the hydrogenator was again fed with untreated furan and the yield gradually fell off to 90% when the experiment was discontinued. During the latter part of this experiment, the temperature of the liquid fed to the hydrogenator was reduced to 88°–90° C. When the untreated furan was substituted for the caustic treated product, raising the feed temperature to 105° C. did not improve the yield. The pressure of the hydrogenation process was controlled at approximately 500 lbs. per sq. in. (gage pressure) or 500 p. s. i. g.

Having described our invention, we claim:

1. A process for the production of tetrahydrofuran from furan obtained by the catalytic decarbonylation of furfural comprising treatment of said furan with a dilute aqueous solution of a caustic alkali selected from the group consisting of sodium and potassium hydroxides, followed by hydrogenation with an active metal hydrogenation catalyst.

2. The process of claim 1 in which the active metal hydrogenation catalyst is a nickel catalyst.

3. A process for the production of tetrahydrofuran from furan obtained by the catalytic decarbonylation of furfural comprising extracting the furan with a 1 to 15% water solution of an alkali selected from the group consisting of sodium and potassium hydroxides, followed by hydrogenation over an active nickel hydrogenation catalyst.

4. The process of claim 3 in which the alkali solution is an 8–12% solution of potassium hydroxide.

5. The process of claim 3 in which the alkali solution is a 2–4% solution of sodium hydroxide.

References Cited in the file of this patent

UNITED STATES PATENTS

| | | |
|---|---|---|
| 2,033,292 | Lazier | Mar. 10, 1936 |
| 2,337,027 | Cass | Dec. 21, 1943 |
| 2,374,149 | Whitman | Apr. 17, 1945 |

OTHER REFERENCES

Wilson: "Organic Syntheses," Coll. Vol. I, pp. 274–5 (1941).

Starr: "Organic Syntheses," Coll. Vol. II, pp. 566–9 (1943).